United States Patent [19]

Sadanori et al.

[11] Patent Number: 4,660,707
[45] Date of Patent: Apr. 28, 1987

[54] INERTIA LOCK TYPE SYNCHRONOUS CLUTCH MECHANISM

[75] Inventors: Nishimura Sadanori, Saitama; Kudo Satoru, Tokyo, both of Japan

[73] Assignee: Honda Giken Kogyo Kabushiki Kaisha, Tokyo, Japan

[21] Appl. No.: 745,005

[22] Filed: Jun. 14, 1985

[30] Foreign Application Priority Data

Jun. 14, 1984 [JP] Japan ................................ 59-120741
Jun. 14, 1984 [JP] Japan ................................ 59-120743

[51] Int. Cl.⁴ ............................................ F16D 23/06
[52] U.S. Cl. ..................................... 192/53 F; 74/339
[58] Field of Search ................. 192/53 F, 53 R, 53 E, 192/53 A; 74/339

[56] References Cited

U.S. PATENT DOCUMENTS 3,618,724 11/1971 Oehl ................................... 192/53 F
3,631,952 1/1972 Sugimoto et al. .................. 192/53 F
3,695,403 10/1972 Eastwood .......................... 192/53 E
3,700,083 10/1972 Ashikawa et al. ................. 192/53 F

FOREIGN PATENT DOCUMENTS 2390633 1/1979 France ............................. 192/53 F Primary Examiner—George H. Krizmanich
Attorney, Agent, or Firm—Lyon & Lyon

[57] ABSTRACT

An inertia lock type synchronous clutch mechanism in which elastic ring members on blocking rings are engaged by a shift sleeve splined to a clutch hub at a plurality of sloped circumferential cam portions protruding from the inner circumference of the sleeve so that the blocking rings are moved axially into frictional engagement with tapered cone portions of synchronized gears by the force applied through the elastic ring members by the axial shifting action of the shift sleeve. Each of the elastic ring members is formed with a plurality of outwardly convex portions corresponding to the respective cam portions and concave portions between the convex portions so that the elastic ring member concave portions engage grooves formed in the outer circumference of the boss portion of each of the blocking rings, whereby excess bulging of the elastic ring member is prevented.

3 Claims, 10 Drawing Figures

INERTIA LOCK TYPE SYNCHRONOUS CLUTCH MECHANISM

The present invention relates to an inertia lock type synchronous clutch mechanism for use in a vehicular gear transmission of the like.

A mechanism of this general type is known in the prior art, as disclosed in Japanese Patent Laid-Open No. 48-24096 which is illustrated herein by the "Prior Art" FIGS. 1 and 2, wherein the inertia lock type synchronous clutch mechanism has elastic ring members e on blocking rings d engaged by a sleeve b splined to a clutch hub a at a plurality of sloped circumferential cam portions c protruding from the inner circumference of the sleeve b so that the blocking rings d are moved axially into frictional engagement with tapered cone portions g of synchronized gears f through the elastic ring members e by the axial shifting action of the sleeve b. In this prior art mechanism, each of said ring members e is generally constructed of a circular, elastic ring which is mounted on the outer circumference of the boss portion of the corresponding blocking ring d. Upon the elastic ring members e being pressed and deformed radially inward at their portions engaged by the respective cam portions c, the elastic rings bulge and deform radially outward at their portions between the cam-engaged portions. As a result, the mechanism has the disadvantage that the depth of the splines on the inner circumference of the sleeve b must be reduced to prevent interference with those bulging portions of the elastic ring.

The present invention has an object to provide a mechanism which is free from the aforesaid disadvantage and is characterized in that each of the blocking rings is formed at a plurality of its circumferential portions corresponding to the respective cam portions with elastic elements which can be elastically deformed in the radial direction to constrict each of said elastic members.

A further object of the present invention is to provide a mechanism which is free from the aforedescribed disadvantage and is characterized in that each elastic ring member is formed with a plurality of convex portions corresponding to the respective cam portions on the inner circumference of the sleeve and concave portions extending between the convex portions so that the elastic ring members are engaged at the respective concave portions by grooves which are formed in the outer circumference of the boss portion of each of the blocking rings.

The present invention will be described in connection with two preferred embodiments illustrated in FIGS. 3 through 10 and in comparison with a prior art mechanism shown in FIGS. 1 and 2, wherein the figures are described as follows.

Figure 1:
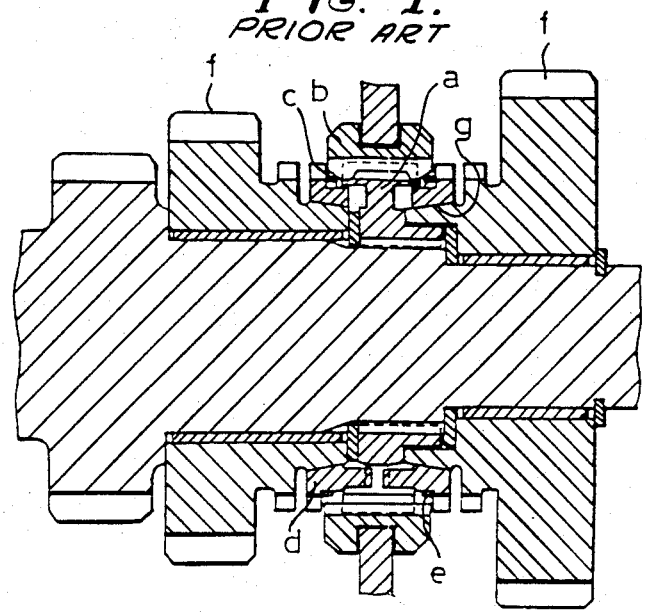
FIG. 1 is a longitudinal sectional view of an example of a prior art mechanism.
Figure 2:
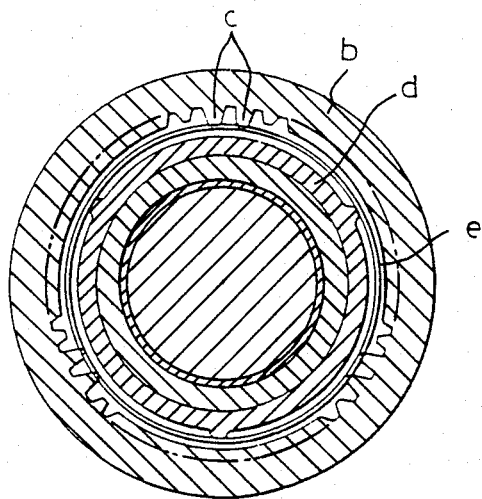
FIG. 2 is a transverse sectional view of the prior art mechanism shown in FIG. 1.
Figure 3:
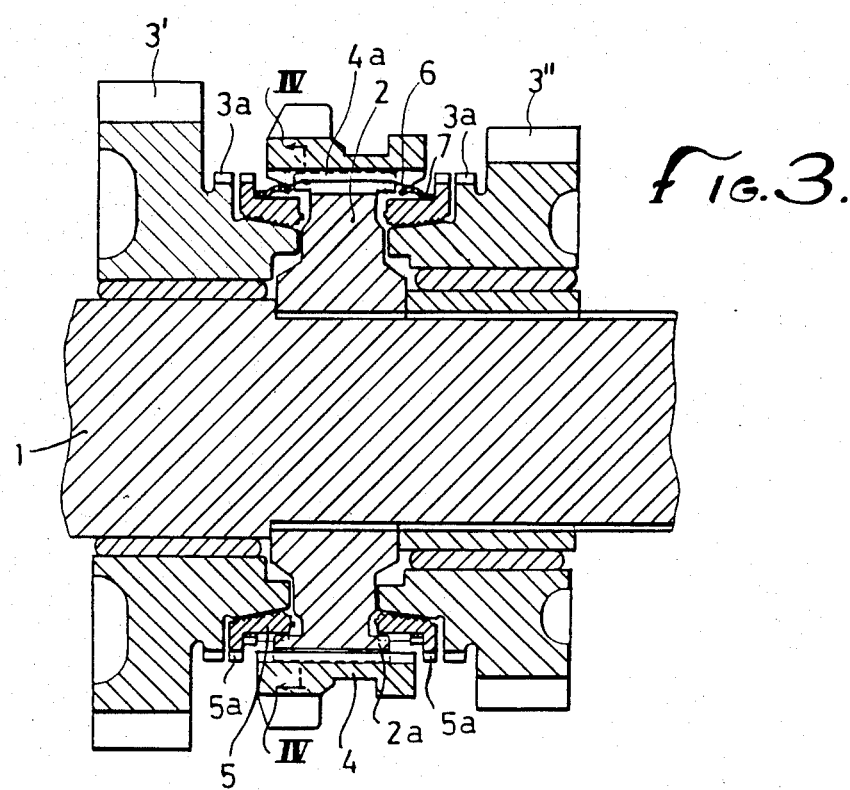
FIG. 3 is a longitudinal sectional view of a first embodiment of the synchronous clutch mechanism of this invention.
Figure 4:
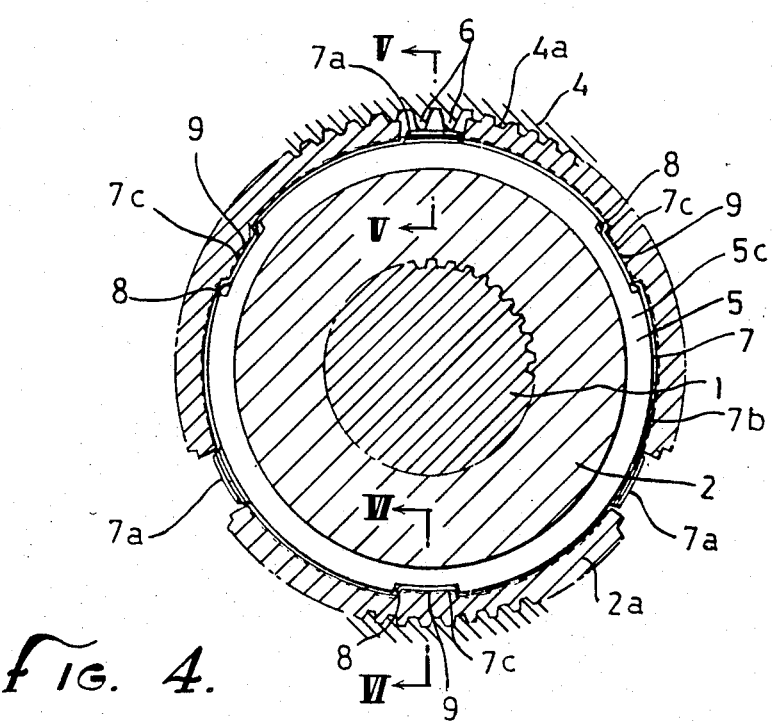
FIG. 4 is a transverse sectional view of the mechanism of FIG. 3 taken substantially on the line IV—IV in FIG. 3.
Figure 5:
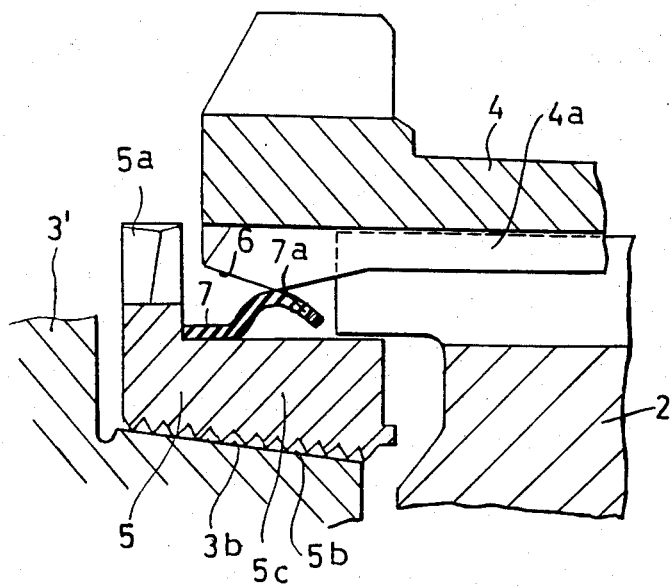
FIG. 5 is an enlarged sectional view of a portion of the mechanism of FIGS. 3 and 4 taken substantially on the line V—V in FIG. 4.
Figure 6:
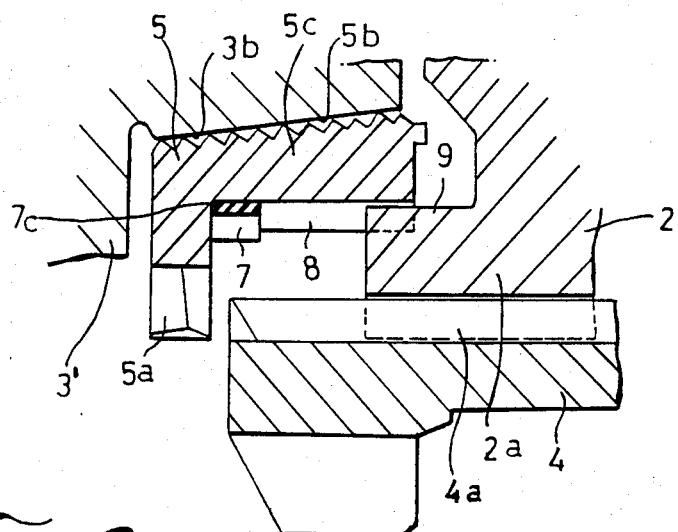
FIG. 6 is an enlarged sectional view of a portion of the mechanism of FIGS. 3 and 4 taken substantially on the line VI—VI in FIG. 4.

The drawings show the present invention as applied to an inertia lock type synchronous clutch mechanism for 1st-2nd speed change of a vehicular gear transmission but it will be understood by those skilled in the art that the invention is equally applicable to other gears and transmissions. Referring to the first embodiment of FIGS. 3-6 an output shaft 1 of the transmission has 1st and 2nd speed synchronous gears 3' and 3" rotatably mounted thereon on opposite axial sides of an intermediate clutch hub 2 which is fixed on the shaft 1. A shift sleeve 4 is splined to a rim portion 2a on the outer circumference of the hub 2 so that the inner circumferential splines 4a of the sleeve 4 and the external splines 3a of each of the gears 3' and 3" mesh with each other upon the axial shifting action of said sleeve 4 from a neutral position shown to one or the other axial side by means of a shift fork (not shown) to effect selective connection between each of the gears 3' and 3" and said shaft 1. In order for the rotation of each of the gears 3' and 3" to be synchronized with the sleeve 4 upon that meshing engagement, there is a blocking ring 5 mounted on a tapered cone portion 3b of each of the gears 3' and 3" adjacent the hub 2, which blocking rings 5 each has a spline 5a on its outer circumference. Each of the blocking rings 5 is engaged with the hub 2 in a manner whereby it can rotate relative thereto by at least one half pitch of the splines, as will be described hereinafter. Moreover, the sleeve 4 is formed with a plurality of, e.g. three radially sloped cam portions 6 comprised of a pair of cams protruding from each axial end of the sleeve 4 and such that the three cam portions 6 are angularly spaced by 120 degrees. Mounted between the sleeve 4 and each of the blocking rings 5 is an elastic member 7 adapted to engage the cam portions 6 of each pair. With this construction, as the sleeve 4 is shifted from its neutral position to one axial side, e.g., toward the 1st speed synchronized gear 3', the blocking ring 5 at the one side is first moved axially by the elastic member 7 on that same side into frictional engagement with the tapered cone portion 3b of the gear 3' at the threaded tapered hole 5b formed in the inner circumference of the blocking ring 5. This causes the blocking ring 5 to be rotated a small amount relative to the clutch hub 2 so that it is indexed into the state in which the chamfers at the end portions of the splines 4a of the sleeve 4 and the chamfers of the splines 5a of the blocking ring 5 face each other. Further axial movement of the sleeve 4 from that state causes the elastic ring member 7 to be pressed radially inward at the respective cam portions 6, and the two chamfers to abut against each other to stop the relative rotational movement of the sleeve 4 and to force the blocking ring 5 into frictional engagement with the cone portion 3b on the gear 3' so that synchronization between the sleeve 4 and the gear 3' is effected through the blocking ring 5. After completion of this synchronization, the frictional torque transmitted through the ring 5 and cone portion 3b disappears to release the blocking force of the sleeve 4 whereupon the sleeve 4 is allowed to move axially so that its splines 4a slide through the splines 5a of the blocking ring 5 into engagement with the splines 3a of the gear 3'.

The construction of the clutch mechanism as thus far described is not especially different from that of the aforementioned prior art. In the first embodiment of this invention, as shown in FIGS. 3–6, each of the blocking rings 5 is formed at its three portions corresponding to the locations of the respective cam portions 6 with tongue-shaped elastic elements 7a which can be elastically deformed radially inward to constrict each of the aforementioned elastic members 7. In the shown construction, those elastic elements 7a are protruded integrally from a common ring body 7b which is fitted on the boss portion 5c of each of the blocking rings 5, and is engaged with respective grooves 8 in the outer circumference of the boss portion 5c at respective recesses 7c which are formed between the protrusions of the elastic elements 7a, so that these elastic elements 7a are so positioned as to correspond to the respective cam portions 6. However, the elastic members 7a should not be limited thereto but may be individually fixed on the corresponding blocking rings 5 and isolated from one another.

In this construction, the clutch hub 2 is formed on the inner circumference of its rib portion 2a with engagement lands 9 which are adapted to engage with the respective grooves 8 with some circumferential play being left so that the blocking rings 5 are engaged with the hub 2 such that they can rotate relative to the same by at least one half pitch of the splines, as has been described hereinbefore.

Next, the operation of the mechanism of the first embodiment of FIGS. 3–6 will be described in the following. When the sleeve 4 is shifted axially to one side so as to effect a shift to the 1st speed, for example, the respective cam portions 6 on the inner circumference of the sleeve 4 first abut against the respective elastic elements 7a and in turn on the blocking ring 5 on that side so that the ring 5 is moved axially by the elastic elements 7a, whereby the indexing action and the balking action are accomplished to effect the synchronization between the 1st speed synchronized gear 3' and the sleeve 4. After completion of this synchronization, the cam portions push down on the respective elastic members 7a radially inward to ride over the same. The portions of each of the elastic members other than those engaged by the respective cam portions are bulged and deformed radially outward if that elastic member is made of a circular ring like the aforementioned example of the prior art. According to the present invention, however, these bulges and deformations are not caused at the portions of the elastic ring circumferentially between the elastic elements 7a so that elastic ring member 7 does not interfere with splines 4a even if the splines 4a of the sleeve 4 are deep.

Figure 7:
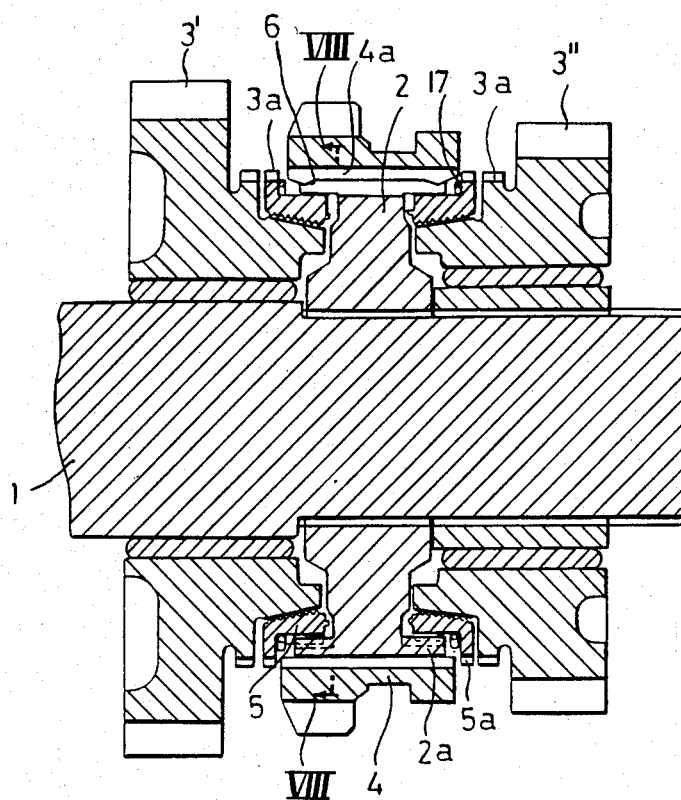
FIG. 7 is a longitudinal sectional view of a second embodiment of the synchronous clutch mechanism.
Figure 8:
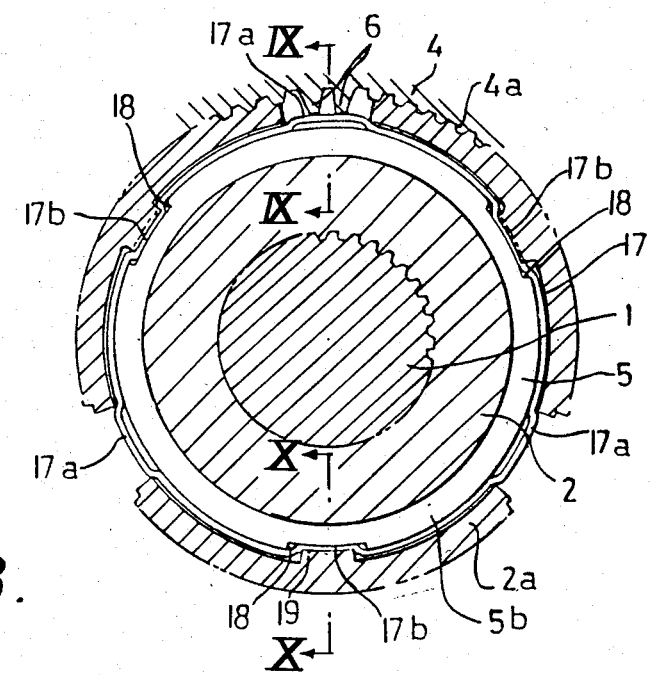
FIG. 8 is a transverse sectional view of the mechanism of claim 7 taken substantially on the line VIII—VIII of FIG. 7.
Figure 9:
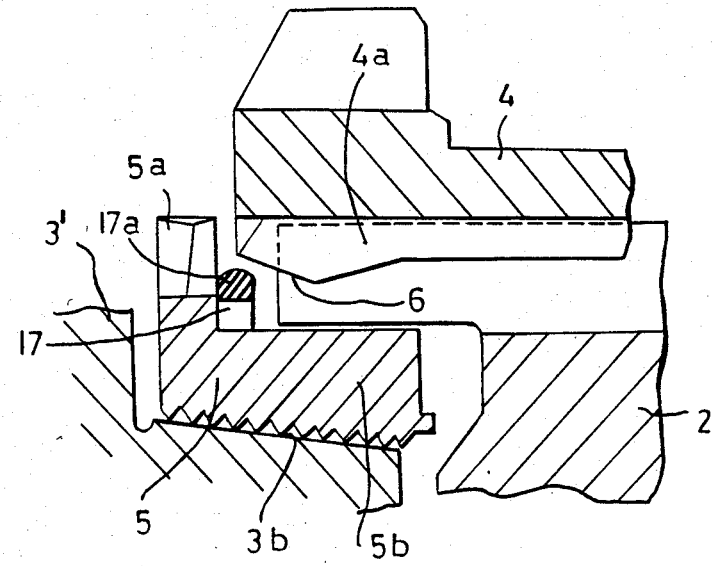
FIG. 9 is an enlarged sectional view of a portion of the mechanism of FIGS. 7 and 8 taken substantially on the line IX—IX in FIG. 8.
Figure 10:
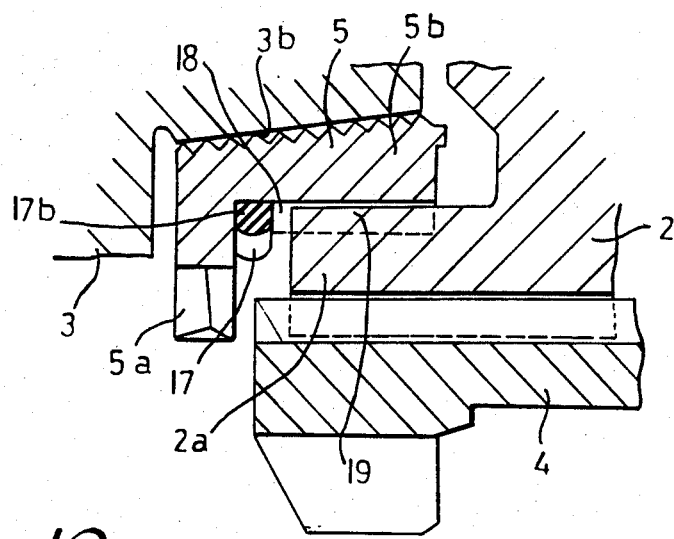
FIG. 10 is an enlarged sectional view of a portion of the mechanism of FIGS. 7 and 8 taken substantially on the line X—X in FIG. 8.

Referring now to the second embodiment of FIGS. 7–10, like components having like functions have been given the same identifying numerals as in the first embodiment and the description thereof will not necessarily be repeated here.

In this second embodiment of the present invention, each of the elastic ring members 17 is formed at circumferentially spaced locations with three convex portions 17a corresponding to the respective locations of the aforementioned cam portions 6 and three concave portions 17b between those convex portions 17a. Each of the elastic ring members 17 is mounted in the boss portion 5b of the corresponding one of the blocking rings 5 to engage with three circumferentially spaced grooves 18 which are formed in the outer circumference of the boss portion 5b so that the elastic ring member does not freely rotate relative to the corresponding blocking rings 5.

Again, as with the first embodiment, the clutch hub 2 is formed on the inner circumference of its rib portion 2a with engagement land 19 which are adapted to engage with the respective grooves 18 with circumferential play being left so that each of the blocking rings 5 is engaged with said hub 2 such that it can rotate relative to the same by at least one half pitch of the splines, as has been described hereinbefore.

Next, the operation of this second embodiment will be described. When the sleeve 4 is shifted axially to one side so as to effect a shift to the 1st speed, for example, the respective cam portions 6 on the inner circumference of the sleeve 4 first abut against the respective convex portions 17a of the elastic ring member 17, which is fixed against rotation relative to the blocking ring on that same side, and in turn the blocking ring 5 is moved axially by the elastic ring member 17, whereby the indexing action and the balking action are accomplished to effect the synchronization between the 1st speed synchronized gear 3' and the sleeve 4. At the end of this synchronization, the cam portions 6 push down the respective elastic members 17a radially inward and ride over the same. At this time, the elastic ring member 17 is more or less bulged and deformed radially outward at its portions between the respective convex portions 17a. However, the ring member 17 does not interfere with the splines 4a of sleeve 4 even if the depth of the splines 4a is enlarged, because the elastic ring member 17 is contoured such that its convex portions 17a are of normal diameter and the remaining portions are radially smaller.

Thus, according to the present invention, the elastic ring members are formed with convex and concave portions, the latter of which are engaged with the respective ones of the grooves in the boss portion of the blocking rings to prevent rotation of the ring members and the former of which are engaged with the respective cam portions on the inner circumference of the sleeve. As compared with the aforementioned example of the prior art in which the elastic ring members are made of circular rings, the elastic ring members herein are prevented from being bulged and deformed outward at the portions other than the portions engaging the cam portions so that they do not interfere with the sleeve splines. This results in an advantage that the sleeve splines can be made deeper than those of the prior art.

What is claimed:

1. An inertia lock type synchronous clutch mechanism in which elastic ring members on blocking rings are engaged by a plurality of sloped circumferential cam portions protruding from the inner circumference of a shift sleeve splined to a clutch hub so that said blocking rings are moved axially into frictional engagement with tapered cone portions of synchronized gears by force applied through said elastic ring members by the axial shifting action of said sleeve, the improvement comprising, each of said elastic ring members is formed at a plurality of circumferential portions corresponding to the respective said cam portions with outwardly extending elastic elements which can be elastically deformed in the radial direction to constrict each of said elastic ring members.

2. An inertia lock type synchronous clutch mechanism in which elastic ring members on blocking rings are engaged by a plurality of sloped circumferential cam portions protruding from the inner circumference of a sleeve splined to a clutch hub for axial movement so that said blocking rings are movable axially into frictional engagement with tapered cone portions of synchronized gears by force applied through said elastic ring members by the axial shifting action of said sleeve, the improvement comprising, each of said elastic ring members being formed with a plurality of circumferentially spaced convex portions corresponding to the respective said cam portions and concave portions circumferentially between said convex portions, and circumferentially spaced grooves in the outer circumference of said blocking rings at locations for being engaged by each of said concave portions for preventing excessive bulging of said elastic ring members by the engagement of the cam portions.

3. An inertia lock type synchronous clutch mechanism for a pair of transmission gears rotatably mounted on a shaft, comprising, a clutch hub fixed on the shaft and positioned between the gears, said clutch hub having an external spline, a shift sleeve mounted on said clutch hub and having an internal spline mating with said hub external spline for axial sliding movement of said shift sleeve, a blocking ring on each axial side of each clutch hub and having means for frictionally engaging the gear on that side upon axial movement toward that gear, each said blocking ring and gear having external spline means for engagement by said sleeve internal spline, an elastic ring positioned between each said blocking ring and said clutch hub, a plurality of circumferentially spaced cam portions on the interior of each axial end of said shift sleeve and a like plurality of circumferentially spaced convex portions on each said elastic ring in the same circumferential locations for engaging said cam portions, each said elastic ring having inwardly concave portions between said convex portions, and circumferentially spaced grooves in each said blocking ring for receiving and mating with said concave portions on said elastic ring members.

* * * * *